US012123827B2

(12) United States Patent
Li et al.

(10) Patent No.: US 12,123,827 B2
(45) Date of Patent: Oct. 22, 2024

(54) PLASMONIC STRUCTURE, LIGHT SOURCE, AND WAVELENGTH SELECTIVE ABSORBER

(71) Applicant: TAMRON CO., LTD., Saitama (JP)

(72) Inventors: Jie Li, Saitama (JP); Shunya Fukui, Saitama (JP)

(73) Assignee: TAMRON CO., LTD., Saitama (JP)

( * ) Notice: Subject to any disclaimer, the term of this patent is extended or adjusted under 35 U.S.C. 154(b) by 183 days.

(21) Appl. No.: 17/501,600

(22) Filed: Oct. 14, 2021

(65) Prior Publication Data

US 2022/0205903 A1 Jun. 30, 2022

(30) Foreign Application Priority Data

Dec. 28, 2020 (JP) .................................. 2020-219597

(51) Int. Cl.
*G01N 21/33* (2006.01)
*G01J 3/02* (2006.01)
*G01J 3/42* (2006.01)

(52) U.S. Cl.
CPC ............ *G01N 21/33* (2013.01); *G01J 3/0205* (2013.01); *G01J 3/42* (2013.01)

(58) Field of Classification Search
CPC ........... G01N 21/33; G01J 3/0205; G01J 3/42
See application file for complete search history.

(56) References Cited

U.S. PATENT DOCUMENTS

2017/0219746 A1* 8/2017 Nagao ....................... C23F 1/02

FOREIGN PATENT DOCUMENTS

JP 2019077007 A * 5/2019
JP 2020094973 A * 6/2020

* cited by examiner

*Primary Examiner* — Uzma Alam
*Assistant Examiner* — Huy Phillip Pham
(74) *Attorney, Agent, or Firm* — Paratus Law Group, PLLC

(57) ABSTRACT

In a plasmonic structure, a first conductor layer, a dielectric layer, and a second conductor layer are stacked in this order. The second conductor layer includes a plurality of conductor patterns that is two-dimensionally and periodically arranged, each of the plurality of conductor patterns having a circular shape or a regular polygonal shape. A diameter D of a circle circumscribed on each of the plurality of conductor patterns satisfies 200 nm≤D≤800 nm. A thickness g of the dielectric layer and the diameter D satisfy 0.3≤g/D≤0.6.

7 Claims, 7 Drawing Sheets

PLASMONIC STRUCTURE, LIGHT SOURCE, AND WAVELENGTH SELECTIVE ABSORBER

CROSS-REFERENCE TO RELATED APPLICATIONS

This application is based on and claims the benefit of priority from Japanese Patent Application No. 2020-219597, filed on Dec. 28, 2020, the entire contents of which are incorporated herein by reference.

BACKGROUND OF THE INVENTION

Technical Field

The present invention relates to a plasmonic structure, a light source, and a wavelength selective absorber.

Related Art

In order to efficiently utilize energy, a process of heat radiation that configures part of an energy transportation process has an extremely high level of importance. However, in general, heat radiation from an object occurs in a wide wavelength band, that is, a broadband. Therefore, in an unneeded wavelength band, an energy loss occurs due to heat radiation. For example, in an incandescent lamp, a large part of supplied power is emitted as infrared radiation that is unneeded for illumination. Stated another way, a large part of supplied power is not utilized for illumination, and is wasted. Therefore, from a viewpoint of enhancing the utilization efficiency of energy, a wavelength selective radiation body has been attracting attention. The wavelength selective radiation body controls a spectral emissivity of a surface of material to improve an emissivity in a desired wavelength band and reduce an emissivity in a band other than the desired wavelength band.

According to the Kirchhoff's law, the emissivity of an object is equal to absorptivity. Accordingly, the wavelength dependency of an absorptivity (also called an absorption characteristic) of a surface of material is controlled, and therefore a wavelength selective radiation body is obtained. However, in a method that utilizes an absorption characteristic that is specific to material, it is difficult to arbitrarily control a radiation wavelength. Therefore, it cannot be said that this method has a high degree of freedom.

On the other hand, a technology of controlling a spectral emissivity by forming a fine structure on a surface of material has been attracting attention in recent years. This is because this technology enables a spectral emissivity to be controlled by controlling a size or a period of a fine structure regardless of an optical characteristic that is specific to material. This method has a higher degree of freedom than a method for controlling an absorption characteristic of a surface of material.

In recent years, from among fine structures, a structure called a plasmonic structure has been proposed. The plasmonic structure is a structure that generates plasmon resonance due to light irradiation. Accordingly, an electric field is enhanced, and an amount of absorption of light increases. Heat radiation having high efficiency can be achieved according to a principle that is similar to a principle of light absorption having high efficiency. An example of a document that discloses a technology of controlling an absorption/radiation rate by using a plasmonic structure is JP 2019-77007 A.

JP 2019-77007 A discloses a plasmonic structure that can have a relatively high melting point and can have relatively large absorptivity and emissivity of light. A plasmon resonance structure described in JP 2019-77007 A exhibits large absorptivity and emissivity of light in a visual light region (ranging from 400 nm to 800 nm inclusive) and a near infrared region (ranging from 2 µm to 5.5 µm inclusive).

However, in a method for enhancing emissivity by forming a plasmonic structure on a surface of material, a bandwidth of a wavelength band having large absorptivity and emissivity (for example, 90% or more) is likely to be narrow, as described in JP 2019-77007 A.

One aspect of the present invention has been made in view of the problem described above, and it is an object to widen a band having large absorptivity and emissivity in comparison with a conventional plasmonic structure.

SUMMARY OF THE INVENTION

In order to solve the problem described above, a plasmonic structure in a first aspect of the present invention employs a structure in which a first conductor layer that covers a specified surface, a dielectric layer, and a second conductor layer are stacked in this order, and the second conductor layer includes a plurality of conductor patterns that is two-dimensionally and periodically arranged, each of the plurality of conductor patterns having a circular shape or a regular polygonal shape.

Moreover, the plasmonic structure in the first aspect employs a structure in which a diameter D of a circle that is circumscribed on each of the conductor patterns satisfies 200 nm≤D≤800 nm, and a thickness g of the dielectric layer and the diameter D satisfy 0.3≤g/D≤0.6.

In order to solve the problem described above, a light source in a sixth aspect of the present invention includes: a substrate; and the plasmonic structure in any one of the first aspect to a fifth aspect that includes the first conductor layer, the dielectric layer, and the second conductor layer that are stacked in this order on a surface of the substrate, the plasmonic structure emitting light in a specified wavelength band due to heating.

In order to solve the problem described above, a configuration is employed in which a wavelength selective absorption element in a seventh aspect of the present invention includes: a substrate; and the plasmonic structure in any one of the first aspect to the fifth aspect that includes the first conductor layer, the dielectric layer, and the second conductor layer that are stacked in this order on a surface of the substrate, the plasmonic structure absorbing light in a specified wavelength band.

By employing a plasmonic structure in one aspect of the present invention, a band having large absorptivity and emissivity can be widened in comparison with a conventional plasmonic structure.

DESCRIPTION OF THE EMBODIMENTS

Figure 1:
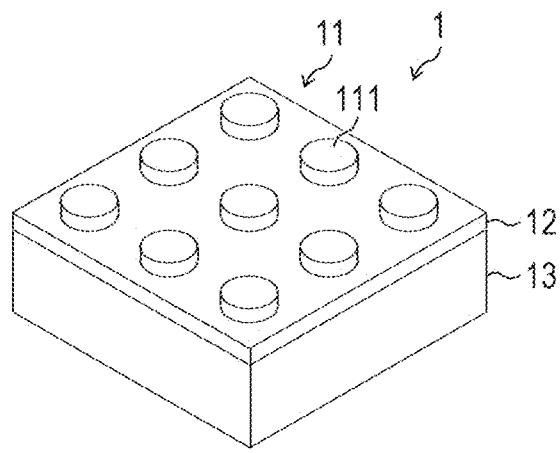
FIG. 1 is a perspective view in which part of a plasmonic structure according to an embodiment of the present invention has been magnified.
Figure 2:
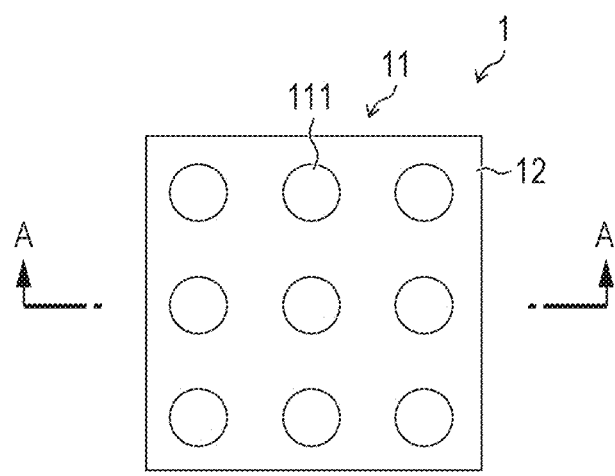
FIG. 2 is a plan view of the part of the plasmonic structure illustrated in FIG. 1.
Figure 3:
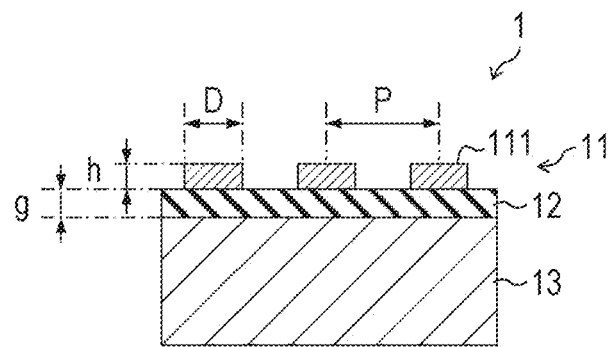
FIG. 3 is a sectional view of the part of the plasmonic structure illustrated in FIG. 1.
Figure 4:
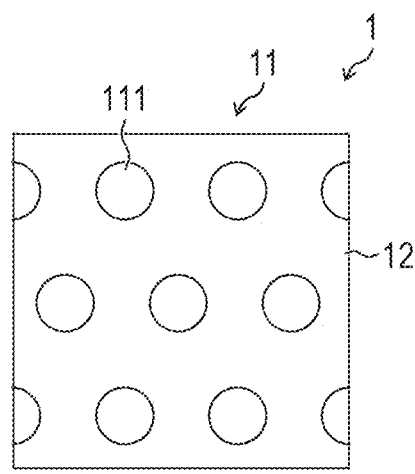
FIG. 4 is a plan view illustrating another example of periodical two-dimensional arrangement of a plurality of conductor patterns included in the plasmonic structure illustrated in FIG. 1.
Figure 5:
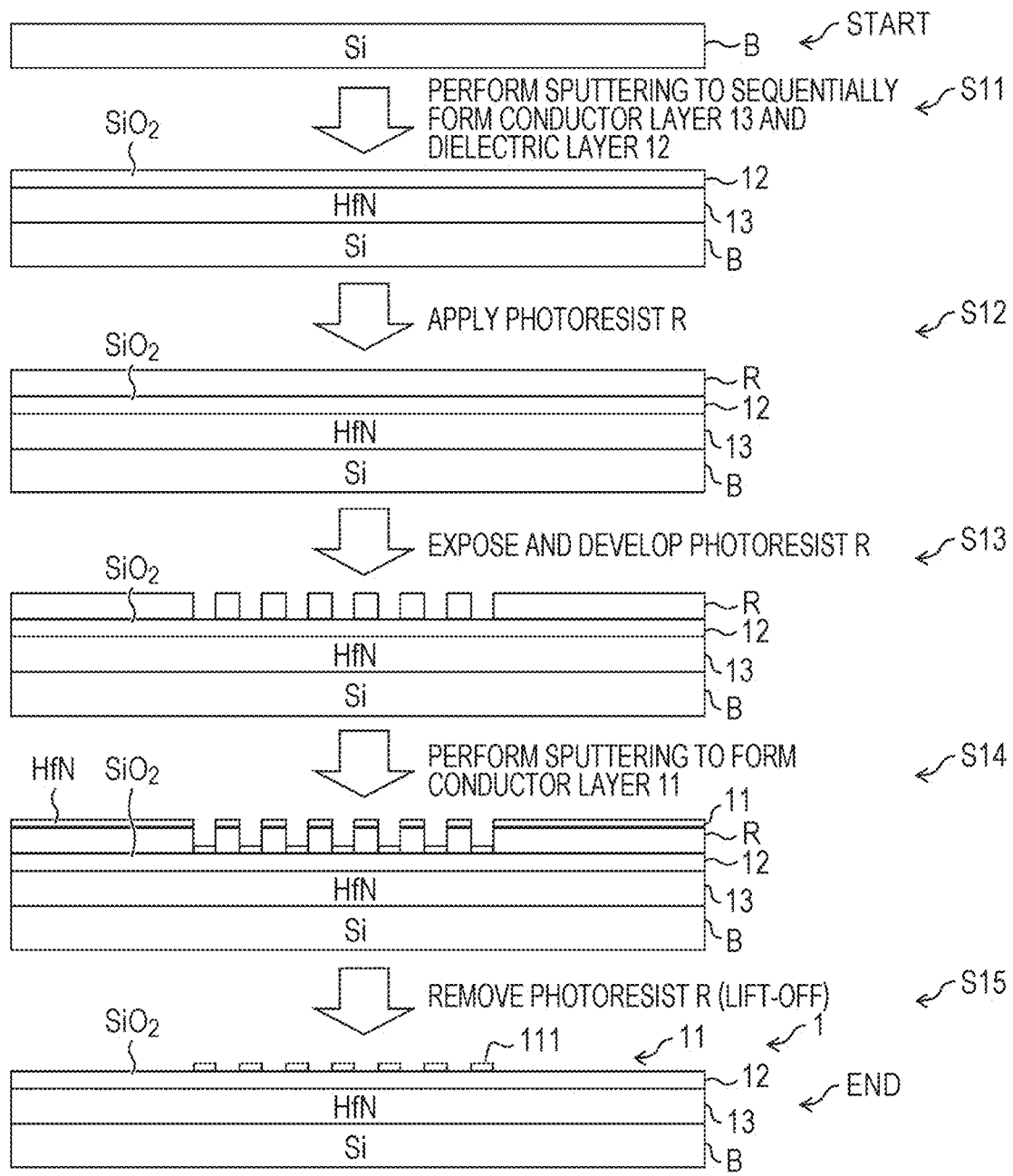
FIG. 5 is a schematic diagram illustrating a method for manufacturing a plasmonic structure according to an embodiment of the present invention.

A plasmonic structure 1 according to an embodiment of the present invention is described with reference to FIGS. 1 to 5. FIG. 1 is a perspective view in which part of the plasmonic structure 1 has been magnified. FIG. 2 is a plan view of the part of the plasmonic structure 1 illustrated in FIG. 1. Note that the plan view of FIG. 2 is obtained by viewing the plasmonic structure 1 from a normal direction relative to a principal face of the plasmonic structure 1 from a side of a conductor layer 11. FIG. 3 is a sectional view of the part of the plasmonic structure 1 illustrated in FIGS. 1 and 2. Note that FIG. 3 illustrates a section along line A-A illustrated in FIG. 2. FIG. 4 is a plan view illustrating another example of periodical two-dimensional arrangement of a plurality of conductor patterns 111 included in the plasmonic structure 1. FIG. 5 is a schematic diagram illustrating an example of a method for manufacturing the plasmonic structure 1.

[Outline of Plasmonic Structure]

It is assumed that the plasmonic structure 1 is formed on a surface of a substrate that is not illustrated in FIG. 1. In the present embodiment, the plasmonic structure 1 including the substrate includes a material that can be heated to high temperature (for example, 500° C. or more). A technique of heating the plasmonic structure 1 including the substrate is not limited. However, an example is a method using a heater or a method for making a current to flow through the plasmonic structure 1 including the substrate. The plasmonic structure 1 that has been heated by a heater or the plasmonic structure 1 that has been heated due to Joule heat resulting from a supplied current emits light having a light-emitting intensity that corresponds to an obtained temperature. Note that in a case where the plasmonic structure 1 is heated by making a current to flow, it is sufficient if either the substrate or the conductor layer 13 is provided with at least a pair of electrodes. The respective electrodes may be connected to the same member of the substrate and the conductor layer 13, or may be connected to members different from each other. Note that a material included in the substrate may or may not be conductive. Stated another way, a conductive characteristic of the material included in the substrate may be metallic or may be semiconductive. Furthermore, the material included in the substrate may be an insulator or a dielectric.

The material included in the substrate is not limited, and may be any of a semiconductor, glass, metal, and metalloid. An example of the semiconductor is silicon (Si). An example of glass is quartz. Examples of metal include platinum (Pt), gold (Au), silver (Ag), tungsten (W), tantalum (Ta), and a nickel-chromium (Ni—Cr) based alloy. An example of metalloid is a carbon material.

Furthermore, FIGS. 1 to 3 illustrate part of the plasmonic structure 1 in a magnified state. Therefore, FIGS. 1 and 2 only illustrate 9 conductor patterns 111, and FIG. 3 only illustrates 3 conductor patterns 111. However, a size of the plasmonic structure 1 in the case of a plan view of the principal face of the plasmonic structure 1 can be arbitrarily determined to correspond to a size of the substrate. Stated another way, the number of conductor patterns 111 that are included in the conductor layer 11 of the plasmonic structure 1 can be arbitrarily determined to correspond to the size of the substrate.

Thus, a light source that includes a substrate and a plasmonic structure 1 in which a conductor layer 13, a dielectric layer 12, and a conductor layer 11 are stacked in this order on a surface of the substrate, and emits light in a specified wavelength band due to heating also falls under the scope of the invention of the present application.

Such a light source improves an emissivity in a desired wavelength band, and reduces an emissivity in a band other than the desired wavelength band in comparison with a normal infrared light source. Therefore, the utilization efficiency of energy can be enhanced. In a case where such a light source is applied to a spectroscopic device or the like, an increase in temperature of the spectroscopic device can be avoided. Furthermore, the plasmonic structure 1 controls a diameter D of a conductor pattern, and therefore a center wavelength (in the case of a light source, an emitted-light center wavelength) in a specified wavelength band can be adjusted. Note that the emitted-light center wavelength also increases as the diameter D increases. By controlling the diameter D, the emitted-light center wavelength can be adjusted, for example, within a range from 500 nm to 4 μm inclusive.

Furthermore, a wavelength selective absorption element that includes a substrate and a plasmonic structure 1 that includes a conductor layer 13, a dielectric layer 12, and a conductor layer 11 that are stacked in this order on a surface of the substrate, the plasmonic structure 1 absorbing light in a specified wavelength band, also falls under the scope of the invention of the present application.

An application example of such a wavelength selective absorption element is a solar-thermophotovoltaic (solar-TPV) system. Solar-TPV temporarily exchanges the entirety of solar energy into heat energy by using a solar light absorbing material, and causes a heat radiation emitter to emit heat radiation light that easily causes a solar cell to generate power. Light emitted from the sun has a wide wavelength distribution. However, a unijunction solar cell can only exchange light having a wavelength that is shorter than a wavelength of a band gap of a semiconductor material to be used into electricity. In other words, light having a wavelength that is longer than the wavelength of the band gap fails to be exchanged into electricity, and becomes a loss. The plasmonic structure 1 increases an absorbable wavelength region, and therefore a solar light spectrum having a wide wavelength distribution can be exchanged into electricity without waste. Accordingly, the plasmonic structure 1 can be applied to an absorption element having wavelength selectivity, or a heat radiation emitter. In this case, a specific example of the specified wavelength band is 600 nm to 1.5 μm inclusive.

Furthermore, another application example of such a wavelength selective absorption element is a base to be used in surface enhanced Raman scattering analysis. As described above, the plasmonic structure 1 absorbs light in a specified wavelength band that corresponds to a diameter D of a conductor pattern. The plasmonic structure 1 can enhance a Raman signal of a molecule absorbed on a surface by utilizing energy of absorbed light. Accordingly, by applying the plasmonic structure 1 to a base to be used in surface enhanced Raman scattering analysis, high-sensitivity Raman scattering analysis can be performed using near infrared light that is transmitted through an organism. Note that in this case, a specific example of the specified wavelength band is 900 nm to 2 μm inclusive.

[Configuration of Plasmonic Structure]

As illustrated in FIG. 1, the plasmonic structure 1 includes a conductor layer 11, a dielectric layer 12, and a conductor layer 13. The conductor layer 11 is an example of a second conductor layer, and the conductor layer 13 is an example of a first conductor layer.

<First Conductor Film>

The conductor layer 13 includes a film that includes a conductor and has been formed on a surface of a substrate to cover the surface of the substrate. Note that the surface of the substrate is an example of a specified surface. The substrate is disposed in a lower layer of a principal face that is located on a lower side from among principal faces of the conductor layer 13, but this is not illustrated in FIGS. 1 and 3.

In the present embodiment, hafnium nitride (HfN) is employed as a material included in the conductor layer 13. However, the material included in the conductor layer 13 is not limited to HfN, and may be any material having a metallic conductive characteristic. In a case where the plasmonic structure 1 is formed on a surface of a substrate that is expected to have high temperature in use, it is preferable that the material included in the conductor layer 13 be a material having a high melting point, such as HfN.

Note that a region where the plasmonic structure 1 is formed (that is, a region where the conductor layer 13 is formed) in the surface of the substrate may be the entirety of the surface of the substrate or may be part of the surface of the substrate, and can be appropriately determined.

In the present embodiment, 100 nm is employed as a thickness of the conductor layer 13. However, the thickness of the conductor layer 13 is not limited, and can be appropriately determined, for example, within a range of 100 nm or more.

<Dielectric Film>

The dielectric layer 12 includes a film that includes a dielectric and has been formed on a principal face on a side opposite to the substrate from among the principal faces of the conductor layer 13 to cover the principal face on the side opposite to the substrate. In FIGS. 1 and 3, the dielectric layer 12 is provided in an upper layer of a principal face that is located on an upper side of the conductor layer 13.

In the present embodiment, silicon oxide (SiO$_2$) is employed as a material included in the dielectric layer 12. However, the material included in the dielectric layer 12 is not limited to SiO$_2$, and may be any material that has translucency for light in a predetermined wavelength band and is an insulator. An example of such a material is insulating oxide. Note that in a case where the plasmonic structure 1 is formed on a surface of a substrate that is expected to have high temperature in use, it is preferable that the material included in the dielectric layer 12 be any of SiO$_2$, Al$_2$O$_3$, and a mixture of SiO$_2$ and Al$_2$O$_3$.

A thickness g of the dielectric layer 12 (see FIG. 3) is determined to correspond to a diameter D (see FIG. 3) of each of the conductor patterns 111 described later. Specifically, each of the thickness g and the diameter D is determined to satisfy $0.3 \leq g/D \leq 0.6$. Stated another way, the thickness g is determined to satisfy $0.3 \times D \leq g \leq 0.6 \times D$.

<Second Conductor Layer>

The conductor layer 11 has been formed on a principal face on a side opposite to the conductor layer 13 from among principal faces of the dielectric layer 12. In FIGS. 1 and 3, the conductor layer 11 is provided in an upper layer of a principal face that is located on an upper side of the dielectric layer 12.

Figure 8:
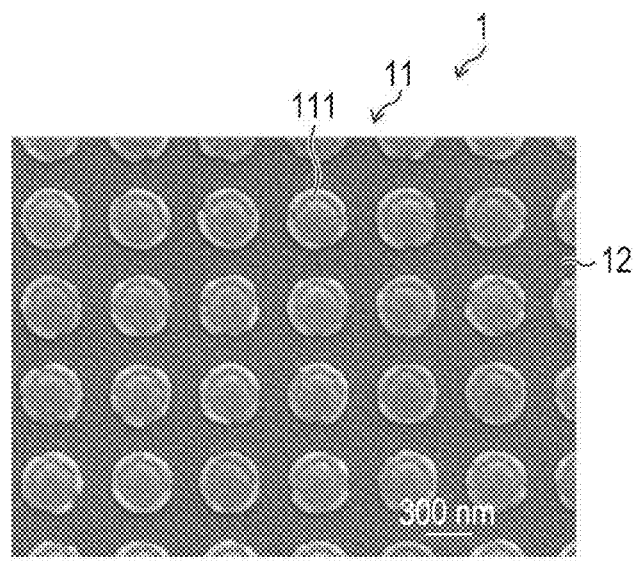
FIG. 8 illustrates an SEM image of a plasmonic structure in the second example of the present invention.

The conductor layer 11 includes a plurality (in FIGS. 1 and 2, nine) of conductor patterns 111 each having a circular shape. However, a shape of each of the conductor patterns 111 is not limited to a circular shape, and may be a regular polygonal shape. A preferable example of the regular polygonal shape is a regular hexagonal shape. Hereinafter, a circular shape includes a circle, and a shape that is based on a circle and has, in its contour, non-isotropic variations and irregular variations resulting from a manufacturing process. For example, a shape of a conductor pattern 111 included in a second example of the present invention illustrated in FIG. 8 is an example of the circular shape. Similarly, a regular polygonal shape includes a regular polygon, and a shape that is based on a regular polygon and has, in its contour, non-isotropic variations and irregular variations resulting from a manufacturing process.

Note that the reference sign 111 is only given to one conductor pattern 111 of the plurality of conductor patterns 111. As illustrated in FIGS. 1 and 2, the plurality of conductor patterns 111 is arranged two-dimensionally and periodically on a principal face of the dielectric layer 12. In the present embodiment, as illustrated in FIG. 2, square arrangement is employed as periodical two-dimensional arrangement of conductor patterns 111. However, this periodical two-dimensional arrangement is not limited to square arrangement, and may be, for example, hexagonal arrangement, as illustrated in FIG. 4.

Figure 7:
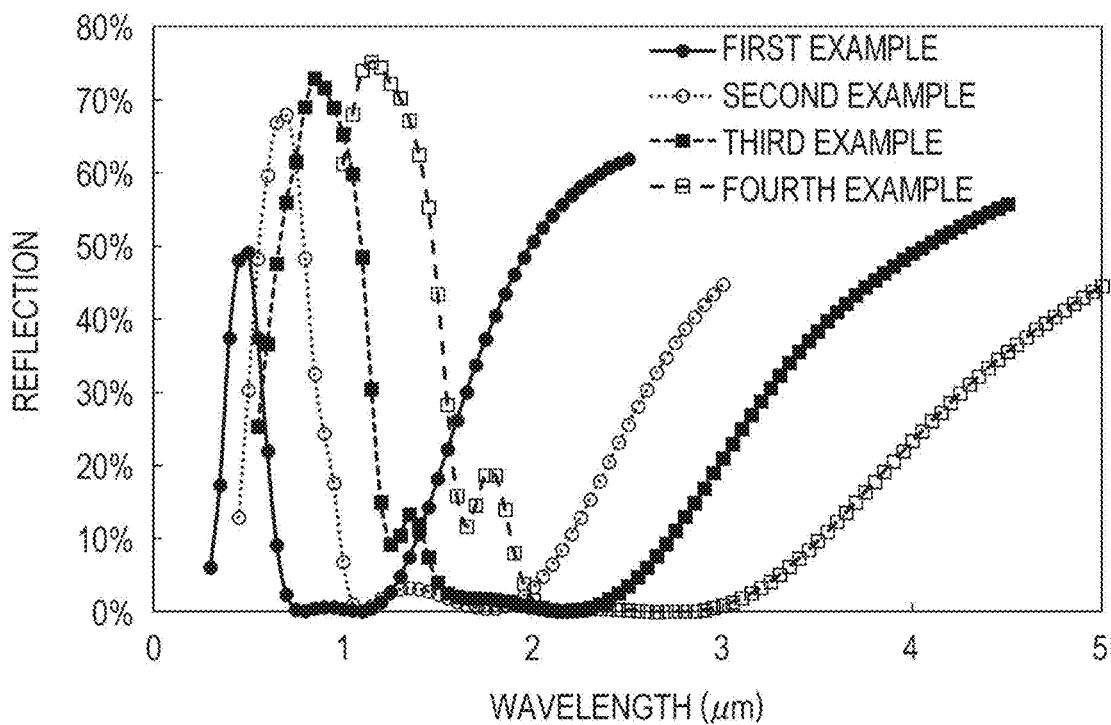
FIG. 7 is a graph illustrating the wavelength dependency of a reflectivity in a plasmonic structure in each of a first example to a fourth example of the present invention.

A diameter D of a circle that is circumscribed on each of the conductor patterns 111 is determined to satisfy $200 \text{ nm} \leq D \leq 800 \text{ nm}$. In a case where a shape of each of the conductor patterns 111 is a circular shape, as described in the present embodiment, a circle that is circumscribed on each of the conductor patterns 111 roughly matches the shape of each of the conductor patterns 111. The diameter D and a center wavelength in an absorption band resulting from a mode in which a diffraction mode and a plasmon mode have been coupled have a positive correlation. Accordingly, by appropriately setting the diameter D within a range in which $200 \text{ nm} \leq D \leq 800 \text{ nm}$, a center wavelength in an absorption band of plasmon absorption can be arbitrarily adjusted. An example of a range in which a center wavelength can be adjusted is about 1 μm to 2.6 μm inclusive, as illustrated in FIG. 7.

Furthermore, a period P serving as a center interval between adjacent conductor patterns 111 of the plurality of conductor patterns 111 is determined to correspond to the diameter D. Specifically, each of the period P and the diameter D is determined to satisfy $1.3 \leq P/D \leq 2.0$. Stated another way, the period P is determined to satisfy $1.3 \times D \leq P \leq 2.0 \times D$.

Furthermore, a thickness h of each of the conductor patterns 111 is 40 nm in the present embodiment. However, the thickness h is not limited to this, and can be appropriately determined.

[Method for Manufacturing Plasmonic Structure]

An example of a method for manufacturing the plasmonic structure 1 is described with reference to FIG. 5. In the present embodiment, in order to pattern the plurality of conductor patterns 111 included in the conductor layer 11, electron-beam lithography is used. However, lithography to be used in this patterning is not limited to electron-beam lithography, if the lithography enables a desired resolution to be achieved. An example of lithography other than electron-beam lithography is UV lithography. Note that a wavelength of ultraviolet rays to be used in TV lithography can be appropriately selected. This wavelength of ultraviolet rays may be included, for example, in a deep ultraviolet (DUV) region, or may be included in an extreme ultraviolet (EUV) region.

Furthermore, in a case where periodical two-dimensional arrangement of the plurality of conductor patterns 111 is hexagonal arrangement, as illustrated in FIG. 4, interference exposure can also be used in the patterning described above. This is because, in interference exposure, a pattern that corresponds to hexagonal arrangement is formed in a region where interference light has a great intensity.

Note that interference exposure is simply described as described below. In a case where a certain diffraction grating is provided under spatially coherent illumination, an intensity pattern having the same period as a period of the diffraction grating is formed at a specified distance from the diffraction grating. Interference exposure is a technology of integrating intensity distributions during one period generated due to the Talbot effect. By using interference exposure when a photoresist R is exposed, cross-order interference can be eliminated.

As illustrated in FIG. 5, a method for manufacturing the plasmonic structure 1 includes a film formation process S11, a spin coating process S12, a lithography process 313, a film formation process S14, and a lift-off process S15. Furthermore, in the present manufacturing method, a wafer made of Si is used as a substrate B that forms the plasmonic structure 1.

The film formation process S11 is a process of forming each of the conductor layer 13 and the dielectric layer 12 on one principal face of the substrate B in such a way that each of the conductor layer 13 and the dielectric layer 12 has a predetermined thickness. In the present embodiment, a sputtering method is used as a film formation method of each of the conductor layer 13 and the dielectric layer 12. However, the film formation method of each of the conductor layer 13 and the dielectric layer 12 is not limited to this.

The spin coating process S12 is a process performed after the film formation process S11, and is a process of performing spin coating to apply the photoresist R to one principal face of the dielectric layer 12 serving as a principal face on a side opposite to the conductor layer 13.

The lithography process S13 is a process performed after the spin coating process S12, and is a process of exposing the photoresist R to correspond to the plurality of conductor patterns 111 by using electron-beam lithography, and developing the photoresist R.

The film formation process S14 is a process performed after the lithography process S13, and is a process of forming the conductor layer 11 on one principal face of the photoresist R serving as a principal face on a side opposite to the dielectric layer 12. In the present embodiment, a sputtering method is used as a film formation method of the conductor layer 11. However, the film formation method of the conductor layer 11 is not limited to this.

The lift-off process S15 is a process performed after the film formation process S14, and is a process of removing the photoresist R by using a solvent. In this process, the conductor layer 11 that has been formed on the photoresist R is removed together with the photoresist R.

By performing the processes described above, the plasmonic structure 1 can be manufactured.

EXAMPLES

Figure 6:
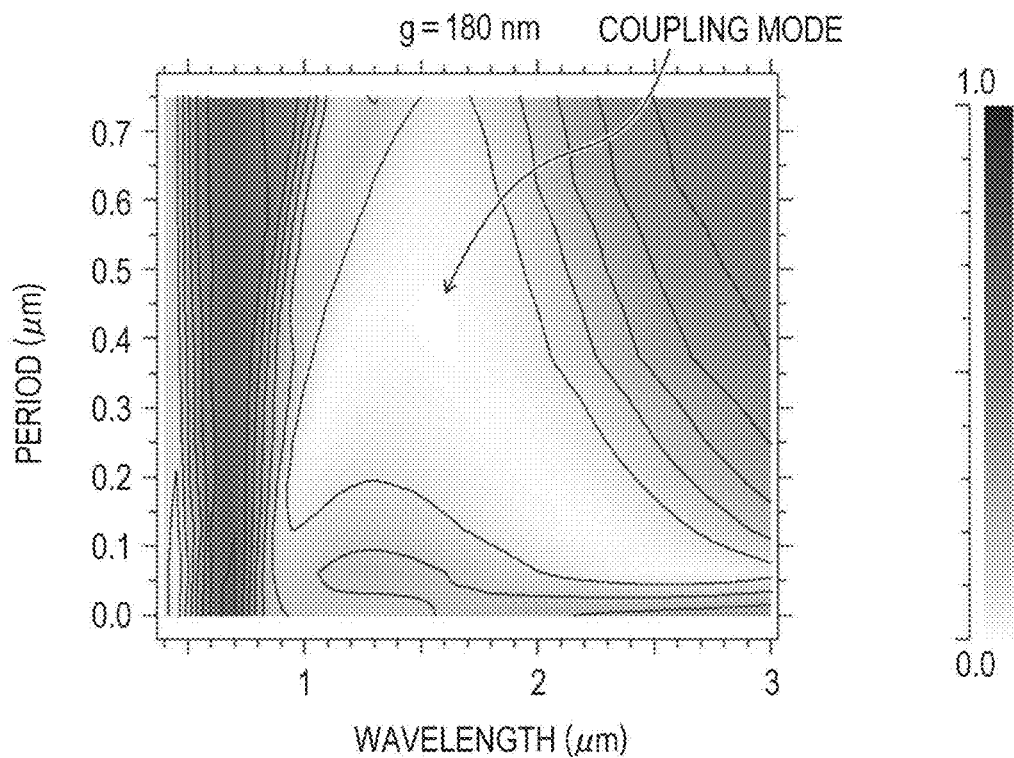
FIG. 6 illustrates a contour map indicating a relationship between a reflectivity, a period, and a wavelength in a plasmonic structure in an example of the present invention.
Figure 9:
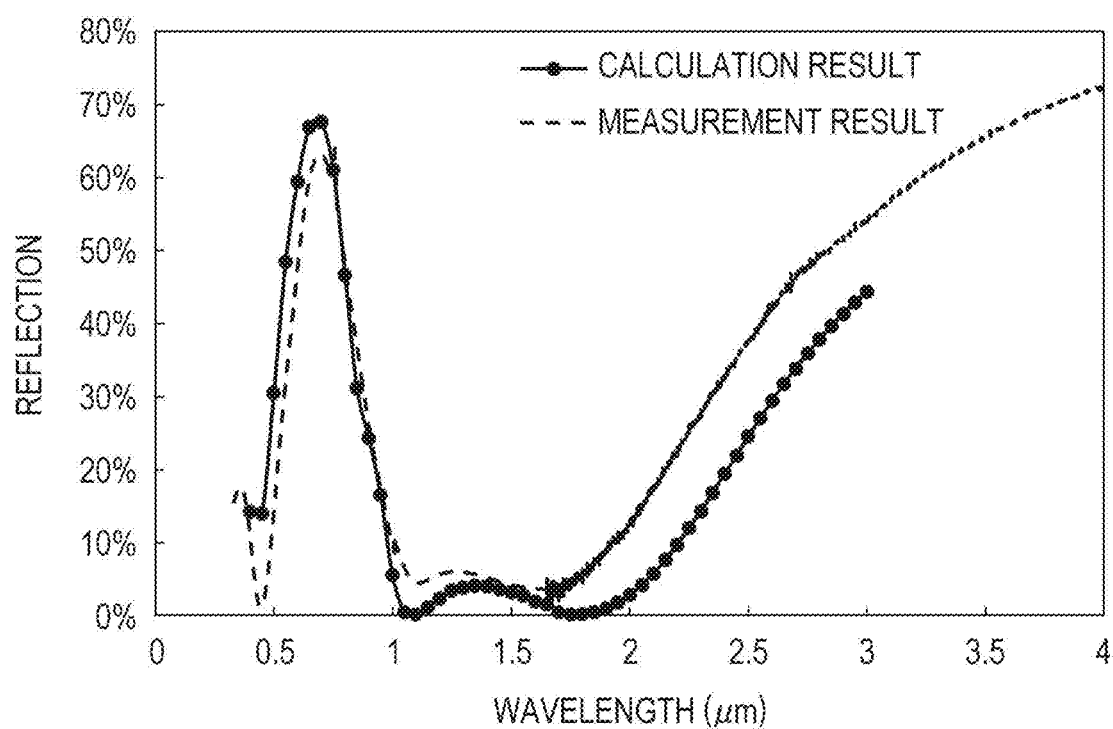
FIG. 9 is a graph illustrating a measurement result and a calculation result of the wavelength dependency of a reflectivity in the plasmonic structure in the second example of the present invention.
Figure 10:
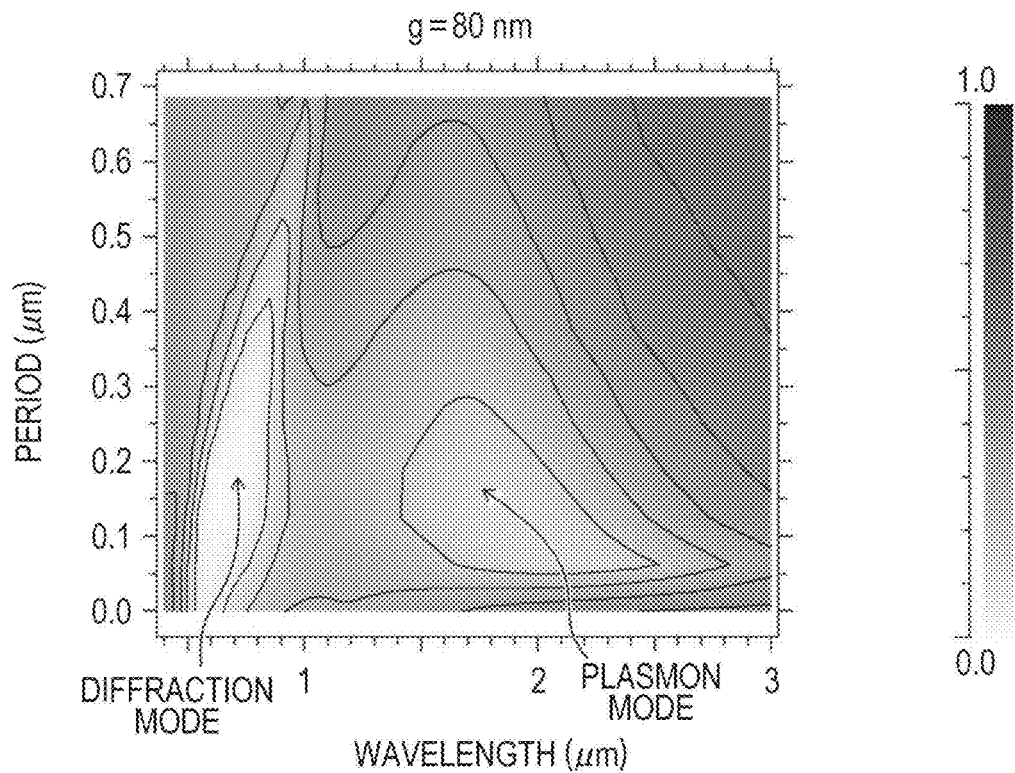
FIG. 10 illustrates a contour map indicating a relationship between a reflectivity, a period, and a wavelength in a plasmonic structure in a first comparative example of the present invention.
Figure 11:
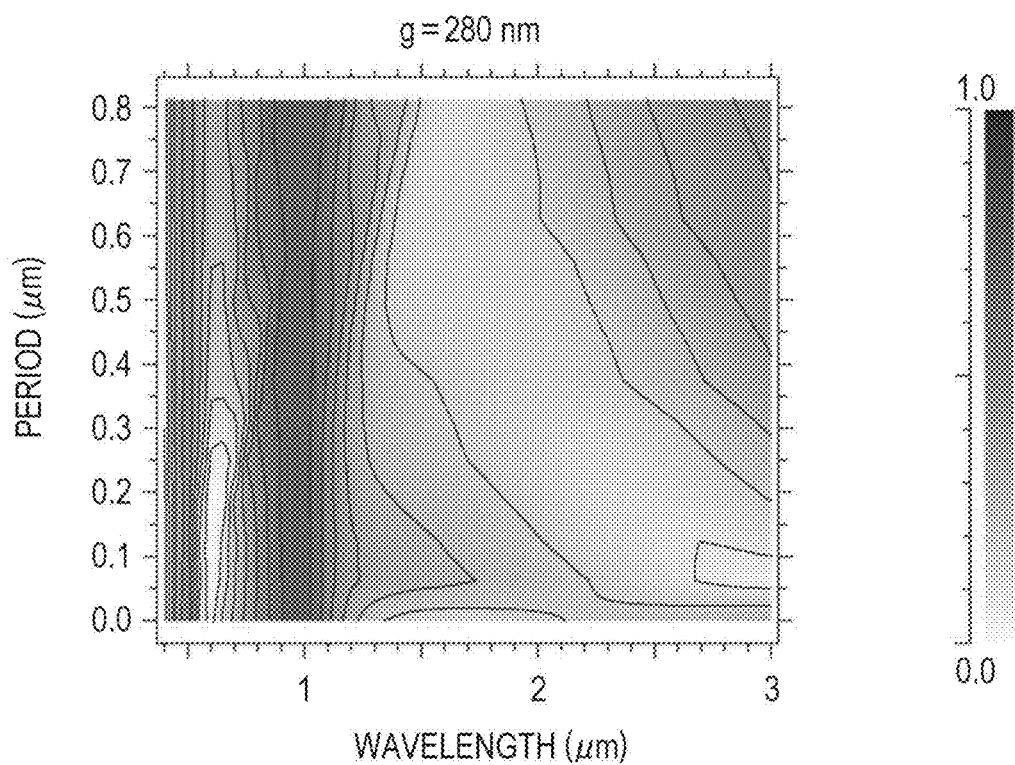
FIG. 11 illustrates a contour map indicating a relationship between a reflectivity, a period, and a wavelength in a plasmonic structure in a second comparative example of the present invention.
Figure 12:
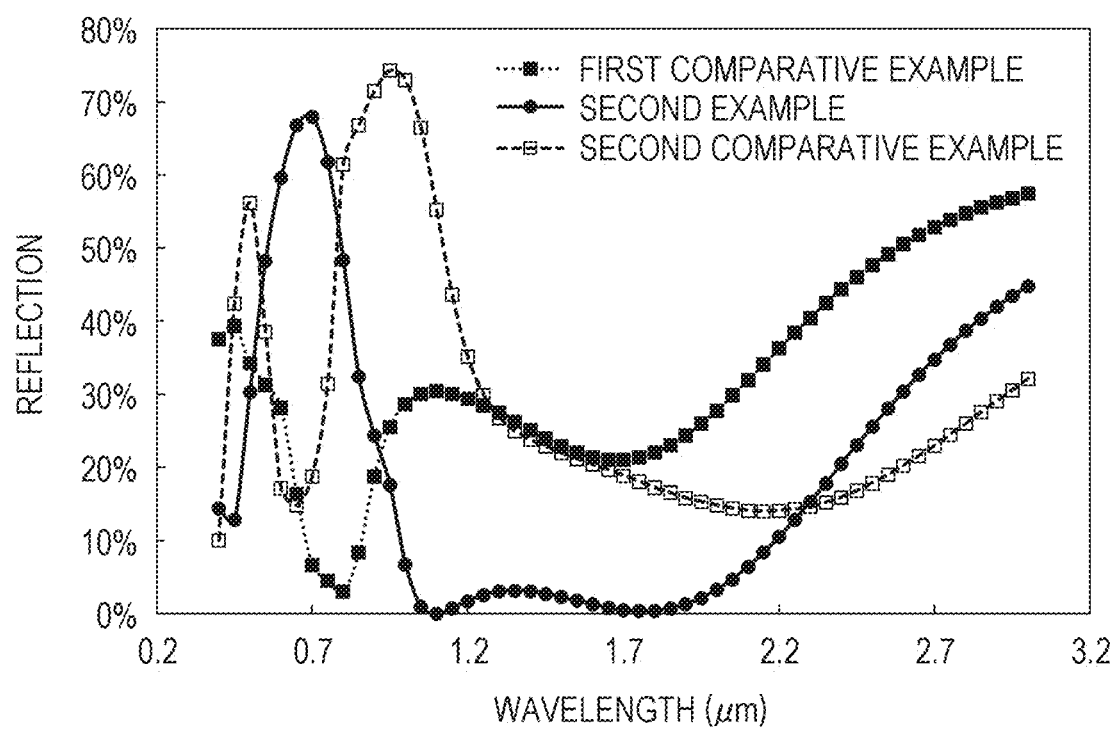
FIG. 12 is a graph illustrating the wavelength dependency of a reflectivity in the plasmonic structure in each of the second example, the first comparative example, and the second comparative example.

Plasmonic structures 1 serving as a first example to a fourth example that configure an example group of the present invention are described with reference to FIGS. 6 to 9. Furthermore, plasmonic structures serving as a first comparative example and a second comparative example of the present invention are described with reference to FIGS. 10 to 12 in comparison with the first examples to the fourth example. FIG. 6 illustrates a contour map indicating a relationship between a reflectivity, a period, and a wavelength in the second example. FIG. 7 is a graph illustrating the wavelength dependency of a reflectivity in each of the first example to the fourth example. FIG. 8 illustrates an SEM image in the second example. FIG. 9 is a graph illustrating a measurement result and a calculation result of the wavelength dependency of a reflectivity in the second example. FIG. 10 illustrates a contour map indicating a relationship between a reflectivity, a period, and a wavelength in the first comparative example. FIG. 11 illustrates a contour map indicating a relationship between a reflectivity, a period, and a wavelength in the second comparative example. FIG. 12 is a graph illustrating the wavelength dependency of a reflectivity in each of the second example, the first comparative example, and the second comparative example.

In each of the first example to the fourth example, in the plasmonic structure 1, respective setting parameters of a diameter D, a period P, a thickness g, and a thickness h have been set as described below. Furthermore, g/D and P/D are also described. Note that dimensions indicated by each of the diameter D, the period, P, the thickness g, and the thickness h are as illustrated in FIG. 3.

First example: D=200 nm, P=300 nm, g=100 nm, h=40 nm, g/D=0.5, P/D=1.5
Second example: D=400 nm, P=650 nm, g=180 nm, h=40 nm, g/D=0.45, P/D=1.625
Third example: D=600 nm, P=1050 nm, g=240 nm, h=40 nm, g/D=0.4, P/D=1.75
Fourth example: D=800 nm, P=1400 nm, g=340 nm, h=40 nm, g/D=0.425, P/D=1.75

Furthermore, in each of the first comparative example and the second comparative example, the thickness g has been changed as described below on the basis of a configuration in the second example. Furthermore, g/D is also described.

First comparative example: g=80 nm, g/D=0.2
Second comparative example: g=280 nm, g/D=0.7

As described above, in the first comparative example, g/D is less than 0.3, and in the second comparative example, g/D is greater than 0.6.

[Simulation Results]

A reflectivity in a case where the period P has been changed within a range from 0.4 μm to 1.2 μm inclusive on the basis of setting parameters in the second example was simulated. In this simulation, it was assumed that linearly polarized light enters a plasmonic structure 1 from a normal direction relative to a principal face of the plasmonic structure 1. Simulation was performed according to the finite difference time domain method (FDTD method). Furthermore, it was assumed that a wavelength of linearly polarized light ranges from 400 nm to 3 μm inclusive. Note that in FIG. 6, reflectivity is indicated by using a gray scale bar. Here, reflectivity can be replaced with absorptivity by using a relational expression between reflectivity and absorptivity (absorptivity=1−reflectivity). Note that hereinafter, a wavelength band in which absorptivity is greater than or equal to 90% (that is, a wavelength band in which reflectivity is less than or equal to 10%) is regarded as a band having a large absorptivity (that is, a band having a large emissivity).

It is apparent from FIG. 6 that in the plasmonic structure 1 based on the setting parameters in the second example, an absorption band of absorption in a mode in which the diffraction mode and the plasmon mode have been coupled exists over a wide wavelength band.

It is apparent from a plot of the second example (g=180 nm) in FIG. 12 that in the second example, absorptivity is greater than or equal to 90% in a wavelength band roughly ranging from 1.0 μm to 2.2 μm inclusive. Stated another way, it is apparent that a bandwidth having a large absorptivity is about 1.2 μm in the second example.

It is apparent from FIG. 10 that in a plasmonic structure based on setting parameters in the first comparative example, the diffraction mode and the plasmon mode are independently induced.

It is apparent from a plot of the first comparative example (g=80 nm) in FIG. 12 that in the first comparative example, absorptivity is greater than or equal to 905 in a wavelength band roughly ranging from 0.7 μm to 0.8 μm inclusive. Stated another way, it is apparent that a bandwidth having a large absorptivity is about 0.1 μm in the first comparative example.

It is apparent from FIG. 11 that in a plasmonic structure based on the setting parameters in the second comparative example, the mode in which the diffraction mode and the plasmon mode have been coupled has disappeared.

It is apparent from a plot of the second comparative example (g=280 nm) in FIG. 12 that a wavelength band in which absorptivity is greater than or equal to 90% does not exist in the second comparative example. It is apparent from this that plasmon resonance that causes strong absorption fails to be induced in a case where a thickness g is excessively increased.

Next, results of similar simulation in the first example to the fourth example are described.

It is apparent from a plot of the first example in FIG. 7 that in the first example, absorptivity is greater than or equal to 90, in a wavelength band roughly ranging from 0.65 μm to 1.45 μm inclusive. Stated another way, it is apparent that a bandwidth having a large absorptivity is about 0.8 μm in the first example. Furthermore, it is apparent that a center wavelength of an absorption band having a large absorptivity is about 1.0 μm.

It is apparent from a plot of the second example in FIG. 7 that in the second example, absorptivity is greater than or equal to 90% in a wavelength band roughly ranging from 1.0 μm to 2.2 μm inclusive. Stated another way, it is apparent that a bandwidth having a large absorptivity is about 1.2 μm in the second example. Furthermore, it is apparent that a center wavelength of an absorption band having a large absorptivity is about 1.6 μm.

It is apparent from a plot of the third example in FIG. 7 that in the third example, absorptivity is greater than or equal to 90% in a wavelength band roughly ranging from 1.4 μm to 2.7 μm inclusive. Stated another way, it is apparent that a bandwidth having a large absorptivity is about 1.3 μm in the third example. Furthermore, it is apparent that a center wavelength of an absorption band having a large absorptivity is about 2.1 μm.

It is apparent from a plot of the fourth example in FIG. 7 that in the fourth example, absorptivity is greater than or equal to 905 in a wavelength band roughly ranging from 1.9 μm to 3.5 μm inclusive. Stated another way, it is apparent that a bandwidth having a large absorptivity is about 1.6 μm in the second example. Furthermore, it is apparent that a center wavelength of an absorption band having a large absorptivity is about 2.7 μm.

As described above, it is apparent that a center wavelength can be adjusted within a range from about 1.0 μm to about 2.7 μm inclusive, by appropriately setting the diameter D within a range in which 200 nm≤D≤800 nm.

Note that in the simulation described above, characteristics of a specified wavelength band having a large absorptivity have been described for a structure (setting of each of the parameters) of the plasmonic structure 1 in each of the examples, and these characteristics are similarly exhibited in light emission due to heating the plasmonic structure. This is because according to the Kirchhoff's law, the emissivity of an object is equal to absorptivity. As described above, by appropriately setting each of the parameters of a plasmonic structure, a plasmonic structure that absorbs light in an arbitrary specified wavelength band from a visual light region to an infrared region (that is, a wavelength selective absorption element) and a plasmonic structure that emits light in an arbitrary specified wavelength band from the visual light region to the infrared region (that is, a light source) can be configured.

[Actual Measurement Results]

Next, a plasmonic structure 1 in the second example was manufactured by using the manufacturing method illustrated in FIG. 5. It is apparent that a plurality of conductor patterns 111 is also periodically and two-dimensionally arranged in an actually manufactured plasmonic structure 1 (see FIG. 8).

It is apparent from FIG. 9 that in the actually manufactured second example, absorptivity is greater than or equal to 90% in a wavelength band roughly ranging from 1.0 μm to 2.0 μm inclusive. Stated another way, it is apparent that a bandwidth having a large absorptivity is about 1.0 μm in the actually manufactured second example. Furthermore, it is apparent that a center wavelength of an absorption band having a large absorptivity is about 1.5 μm.

It is apparent from the results described above that in the actually manufactured plasmonic structure 1, the mode in which the diffraction mode and the plasmon mode have been coupled has been induced, and a large absorptivity is exhibited in a wide band. Furthermore, it is apparent that in a case where a reflection characteristic of the actually manufactured plasmonic structure 1 is compared with a reflection characteristic obtained in simulation, a bandwidth having a large absorptivity slightly decreases, but has a similar tendency, and bandwidths roughly match each other.

SUMMARY

A plasmonic structure in a first aspect of the present invention employs a structure in which a first conductor layer that covers a specified surface, a dielectric layer, and a second conductor layer are stacked in this order, and the second conductor layer includes a plurality of conductor patterns that is two-dimensionally and periodically arranged, each of the plurality of conductor patterns having a circular shape or a regular polygonal shape.

Moreover, the plasmonic structure in the first aspect employs a structure in which a diameter D of a circle that is circumscribed on each of the conductor patterns satisfies 200 nm≤D≤800 nm, and a thickness g of the dielectric layer and the diameter D satisfy 0.3≤g/D≤0.6.

In a conventional plasmonic structure, in general, plasmon absorption resulting from surface plasmon resonance has been used. Accordingly, a bandwidth of an absorption band obtained in the conventional plasmonic structure is principally determined according to a diameter of a conductor pattern, and the bandwidth is narrow.

In the configuration described above, a mode in which the diffraction mode and the plasmon mode have been coupled can be induced, by employing a thickness g that is greater than a thickness of a conventional plasmonic structure and causing the thickness g and the diameter D to satisfy 0.3≤g/D. Therefore, the plasmonic structure in the first aspect can use absorption resulting from the mode in which the diffraction mode and the plasmon mode have been coupled.

The mode in which the diffraction mode and the plasmon mode have been coupled is induced in a band that is wider than a band in the plasmon mode. Accordingly, the plasmonic structure in the first aspect can widen a band having a large absorptivity in comparison with a conventional plasmonic structure. Note that according to the Kirchhoff's law, the emissivity of an object is equal to absorptivity. Therefore, the plasmonic structure in the first aspect can widen a band having a large emissivity in comparison with a conventional plasmonic structure.

Note that in a case where the thickness g is excessively increased, the plasmon mode becomes weaker. Therefore, the mode in which the diffraction mode and the plasmon mode have been coupled fails to be induced. The configuration described above can avoid a situation where the mode in which the diffraction mode and the plasmon mode have been coupled fails to be induced, by causing the thickness g and the diameter D to satisfy g/D≤0.6.

Furthermore, a plasmonic structure in a second aspect of the present invention employs a configuration in which the first conductor layer and the second conductor layer include HfN, in addition to a configuration of the plasmonic structure in the first aspect described above.

Hafnium nitride (HfN) has a melting point of 2573° C., and has a melting point that is higher than a melting point of silver (Ag), gold (Au), copper (Cu), chromium (Cr), aluminum (Al), and iron (Fe) that are often used as a material included in a plasmonic structure. Accordingly, the plasmonic structure in the second aspect can enhance heat resistance in comparison with a plasmonic structure including the metallic material described above. As high-melting-point metal having a melting point of about 3000° C., tungsten (W), tantalum (Ta), and molybdenum (Mo) are known. However, these pieces of high-melting-point metal have a negative real part of permittivity in an infrared region, but have a positive real part of permittivity in a visual region. Accordingly, these pieces of high-melting-point metal do not exhibit a plasmonic effect in the visual region. In order to exhibit the plasmonic effect over a wide wavelength band including visual light, HfN that has a high melting point, and also has a negative permittivity in the visual region is preferable as a material included in the first conductor layer and the second conductor layer.

Furthermore, a plasmonic structure in a third aspect of the present invention employs a configuration in which the dielectric layer includes any of $SiO_2$, $Al_2O_3$, and a mixture of $SiO_2$ and $Al_2O_3$, in addition to a configuration of the plasmonic structure in the first aspect or the second aspect described above.

By employing the configuration described above, heat resistance of a plasmonic structure can be reliably enhanced.

Furthermore, a plasmonic structure in a fourth aspect of the present invention employs a configuration in which a period P in two-dimensional arrangement of the plurality of conductor patterns and the diameter D satisfy 1.3≤P/D≤2.0, in addition to a configuration of the plasmonic structure in any one of the first to third aspects described above.

The configuration described above can sufficiently increase the intensity of the plasmon mode. Therefore, the mode in which the diffraction mode and the plasmon mode have been coupled can be reliably induced. Accordingly, the plasmonic structure in the fourth aspect can reliably widen a band having a large absorptivity in comparison with a conventional plasmonic structure.

Furthermore, a plasmonic structure in a fifth aspect of the present invention employs a configuration in which the plurality of conductor patterns is hexagonally arranged in the second conductor layer, in addition to a configuration of the plasmonic structure in any one of the first to fourth aspects described above.

By employing the configuration described above, the plurality of conductor patterns can be easily made in comparison with a case where arrangement of the plurality of conductor patterns is not hexagonal arrangement. This is because interference exposure can be used instead of electron-beam exposure in a case where the plurality of conductor patterns is exposed.

A light source in a sixth aspect of the present invention includes: a substrate; and the plasmonic structure in any one of the first to fifth aspects that includes the first conductor layer, the dielectric layer, and the second conductor layer that are stacked in this order on a surface of the substrate, the plasmonic structure emitting light in a specified wavelength band due to heating.

By employing the configuration described above, an effect that is similar to an effect of the plasmonic structure in any one of the first to fifth aspects is exhibited. Furthermore, a spectral emissivity in a light source can be controlled by using the plasmonic structure in any one of the first to fifth aspects, and therefore an energy loss can be reduced in the light source.

A configuration is employed in which a wavelength selective absorption element in a seventh aspect of the present invention includes: a substrate; and the plasmonic structure in any one of the first to fifth aspects that includes the first conductor layer, the dielectric layer, and the second conductor layer that are stacked in this order on a surface of the substrate, the plasmonic structure absorbing light in a specified wavelength band.

By employing the configuration described above, an effect that is similar to an effect of the plasmonic structure in any one of the first to fifth aspects is exhibited. Furthermore, by employing the plasmonic structure in any one of the first to fifth aspects, light in a specified wavelength band can be selected.

Supplementary Matters

The present invention is not limited to the respective embodiments described above. Various changes can be made without departing from the scope of the claims, and embodiments obtained by appropriately combining technical means disclosed in respective different embodiments are also included in the technical scope of the present invention.

What is claimed is:

1. A plasmonic structure comprising:
 a first conductor layer that covers a specified surface;
 a dielectric layer; and
 a second conductor layer that includes a plurality of conductor patterns that is two-dimensionally and periodically arranged, each of the plurality of conductor patterns having a circular shape or a regular polygonal shape, the first conductor layer, the dielectric layer, and the second conductor layer being stacked in this order, wherein
 a diameter D of a circle circumscribed on each of the plurality of conductor patterns satisfies a following condition:

$200 \text{ nm} \leq D \leq 800 \text{ nm}$, a thickness g of the dielectric layer and the diameter D satisfy a following condition:

$0.3 \leq g/D \leq 0.6$, and a wavelength band in which absorptivity is greater than or equal to 90% is a wavelength band continuous for 0.5 times or more a value of a center wavelength thereof.

2. The plasmonic structure according to claim 1, wherein the first conductor layer and the second conductor layer include HfN.

3. The plasmonic structure according to claim 1, wherein the dielectric layer includes any of $SiO_2$, $Al_2O_3$, and a mixture of $SiO_2$ and $Al_2O_3$.

4. The plasmonic structure according to claim 1, wherein a period P in two-dimensional arrangement of the plurality of conductor patterns and the diameter D satisfy a following condition:

$1.3 \leq P/D \leq 2.0$.

5. The plasmonic structure according to claim 1, wherein in the second conductor layer, the plurality of conductor patterns is hexagonally arranged.

6. A light source comprising:
 a substrate; and
 the plasmonic structure according to claim 1 that includes the first conductor layer, the dielectric layer, and the second conductor layer that are stacked in this order on a surface of the substrate, the plasmonic structure emitting light in a specified wavelength band due to heating.

7. A wavelength selective absorption element comprising:
 a substrate; and
 the plasmonic structure according to claim 1 that includes the first conductor layer, the dielectric layer, and the second conductor layer that are stacked in this order on a surface of the substrate, the plasmonic structure absorbing light in a specified wavelength band.

* * * * *